(12) United States Patent
Takeshita et al.

(10) Patent No.: US 9,565,237 B2
(45) Date of Patent: Feb. 7, 2017

(54) INFORMATION PROCESSING APPARATUS, INFORMATION PROCESSING SYSTEM, AND NON-TRANSITORY COMPUTER READABLE MEDIUM

(71) Applicant: FUJI XEROX CO., LTD, Minato-ku, Tokyo (JP)

(72) Inventors: Yoshihiro Takeshita, Kanagawa (JP); Yoshifumi Kaneko, Kanagawa (JP)

(73) Assignee: FUJI XEROX CO., LTD, Tokyo (JP)

(*) Notice: Subject to any disclaimer, the term of this patent is extended or adjusted under 35 U.S.C. 154(b) by 183 days.

(21) Appl. No.: 14/466,525

(22) Filed: Aug. 22, 2014

(65) Prior Publication Data
US 2015/0207845 A1 Jul. 23, 2015

(30) Foreign Application Priority Data
Jan. 21, 2014 (JP) ................................ 2014-008997

(51) Int. Cl.
*G06F 15/16* (2006.01)
*H04L 29/08* (2006.01)

(52) U.S. Cl.
CPC ............ *H04L 67/02* (2013.01); *H04L 67/325* (2013.01)

(58) Field of Classification Search
CPC ................................. H04L 67/92; H04L 67/16
USPC ......................................................... 709/202
See application file for complete search history.

(56) References Cited

U.S. PATENT DOCUMENTS

2009/0248754 A1* 10/2009 Lipton et al. ........... G06F 9/485

FOREIGN PATENT DOCUMENTS

JP          11-84784 A     7/1999
JP          11-184784  *   7/1999

* cited by examiner

*Primary Examiner* — Glenford Madamba
(74) *Attorney, Agent, or Firm* — Sughrue Mion, PLLC (57) ABSTRACT

An information processing apparatus includes the following elements. An estimated processing time information obtaining unit obtains estimated processing time information indicating an estimated processing time which will be taken to execute processing specified by a request received from a terminal. An excess information creating unit creates excess information including information concerning the estimated processing time concerning the request if the estimated processing time exceeds a predetermined time. An excess response sending unit sends an excess response including the excess information. A processing result obtaining unit obtains a processing result of the processing specified by the request. A result response sending unit sends a result response including the processing result in response to a request for the processing result.

13 Claims, 11 Drawing Sheets

```
<?xml version="1.0" encoding="UTF-8" standalone="no"?>
<soapEnv:Envelope xmlns:soapEnv="http://schemas.xmlsoap.org/soap/envelope/">
<soapEnv:Bodyxmlns:jl="http://www.fujixerox.co.jp/2003/12/ssm/management/jobLog
">
    <jl:GetJobLog>                                                          A
        <jl:LogNumber>0</jl:LogNumber>
        <jl:PluginID>test.plism.accountingplugin</jl:PluginID>
    </jl:GetJobLog>
</soapEnv:Body>
</soapEnv:Envelope>
```

| CONTENT OF PROCESSING | ESTIMATED PROCESSING TIME (SECONDS) |
|---|---|
| test.plism.accountingplugin | 65 |
| test.plism.accountingplugin2 | 70 |

```
<env:Envelope
xmlns:flt="http://www.fujixerox.co.jp/2003/12/ssm/management/fault"
xmlns:mgt="http://www.fujixerox.co.jp/2003/12/ssm/management"
xmlns:env="http://schemas.xmlsoap.org/soap/envelope/">
   <env:Body xmlns:xsd="http://www.w3.org/2000/10/XMLSchema">
      <GetJobLog xmlns:env="http://www.w3.org/2003/05/soap-envelope"
xmlns="http://www.fujixerox.co.jp/2003/12/ssm/management/job">
         <Fault>
            <mgt:ResopnseID>002</mgt:ResopnseID>        B
            <mgt:WaitingTime>65</mgt:WaitingTime>
            <mgt:Code>env:Receiver</mgt:Code>
            <mgt:Subcode>flt:NeedGetResponse</mgt:Subcode>
            <mgt:Reason xml:lang="en"> takes time</mgt:Reason>
            <mgt:Detail>
               <env:Subcode>
                  <env:Value>flt:NeedGetResponse</env:Value>
               </env:Subcode>
            </mgt:Detail>
         </Fault>
      </GetJobLogResponse>
   </env:Body>
</env:Envelope>
```

```
<?xml version="1.0" encoding="UTF-8" standalone="no"?>
<soapEnv:Envelope xmlns:soapEnv="http://schemas.xmlsoap.org/soap/envelope/">
<soapEnv:Bodyxmlns:xcpm="http://www.fujixerox.co.jp/2003/12/ssm/management/
xcpManage">
    < xcpm:GetResponse>                                          C
        <xcpm:Response ID>002</xcpm: Response >
    </xcpm: GetResponse >
</soapEnv:Body>
</soapEnv:Envelope>
```

```
<?xml version="1.0" encoding="UTF-8" standalone="no"?>
<soapEnv:Envelope xmlns:soapEnv="http://schemas.xmlsoap.org/soap/envelope/">
<soapEnv:Bodyxmlns:xcpm="http://www.fujixerox.co.jp/2003/12/ssm/management/xcpManage">
    < xcpm:GetResponseResponse>
     <JobInfo xmlns="http://www.fujixerox.co.jp/2003/12/ssm/management/job">
      <JobID>e6800001-7b03-11e2-8000-0800379e78bb</JobID>
      <Status>canceledBySystem</Status>
      <StartTime>2013-02-20T11:19:06+09:00</StartTime>
      <CompleteTime>2013-02-20T11:20:39+09:00</CompleteTime>
      <User>11111</User>
      <Name>C:¥Documents and Settings¥Test.xdw</Name>
      +<DeviceJobInformation>
      +<NetInJobInformation>
      +<PrintMediumInformation>
      +<PrintInputTrayInformation>
      +<PrintFinishingInformation>
      +<PrintInterpretingInformation>
      +<PrintSecurityInformation>
      +<AccountingInformation>
      <PlugIn pluginID="test.plism.accountingplugin"
xmlns="http://www.fujixerox.co.jp/2003/12/ssm/management/job">
        <AccessoryType>ICCG</AccessoryType>
        <UnitCost>10</UnitCost>
        <TotalCost>100</TotalCost>
        <CardID>4E6346A3-13C0-46b9-8DA1-734DFA052D75</CardID>
      </PlugIn>
    </JobInfo>
   </xcpm: GetResponse Response>
  </soapEnv:Body>
</soapEnv:Envelope>
```

| CONTENT OF PROCESSING | ACTUAL PROCESSING TIME (SECONDS) |
|---|---|
| test.plism.accountingplugin | 68 |

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-008997 filed Jan. 21, 2014.

BACKGROUND

Technical Field

The present invention relates to an information processing apparatus, an information processing system, and a non-transitory computer readable medium.

SUMMARY

According to an aspect of the invention, there is provided an information processing apparatus including the following elements. An estimated processing time information obtaining unit obtains estimated processing time information indicating an estimated processing time which will be taken to execute processing specified by a request received from a terminal. An excess information creating unit creates excess information including information concerning the estimated processing time concerning the request if the estimated processing time exceeds a predetermined time. An excess response sending unit sends an excess response including the excess information. A processing result obtaining unit obtains a processing result of the processing specified by the request. A result response sending unit sends a result response including the processing result in response to a request for the processing result.

BRIEF DESCRIPTION OF THE DRAWINGS

An exemplary embodiment of the present invention will be described in detail based on the following figures, wherein.

DETAILED DESCRIPTION

An exemplary embodiment of the invention will be described below with reference to the accompanying drawings. In the drawings, identical elements or equivalent elements are designated by like reference numerals, and an explanation of identical elements or equivalent elements will be given only once.

Figure 1:
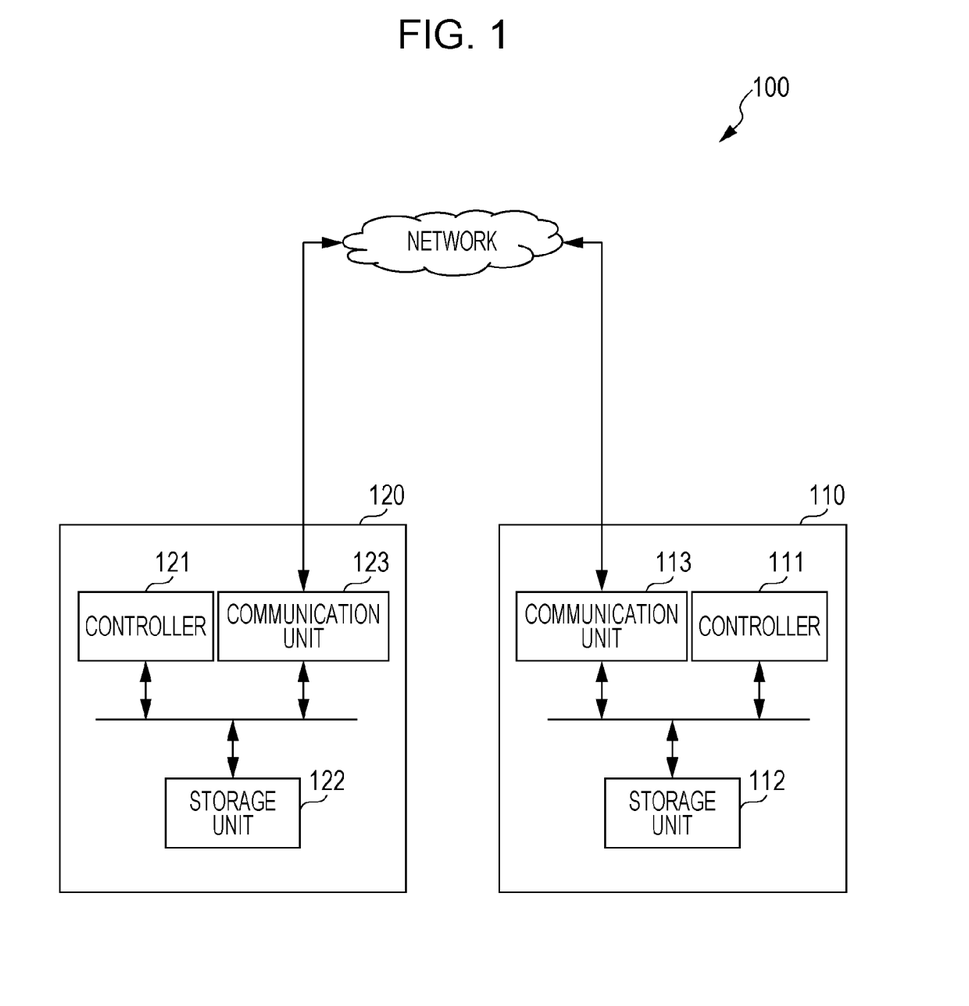
FIG. 1 illustrates an example of the hardware configuration of an information processing system according to an exemplary embodiment of the invention.

FIG. 1 illustrates an overview of the hardware configuration of an information processing system 100 according to an exemplary embodiment of the invention. The information processing system 100 includes an information processing apparatus 110 and a terminal 120. Each of the information processing apparatus 110 and the terminal 120 is connected to a network. Although the information processing system 100 includes only one terminal 120 in FIG. 1, it may include plural terminals 120.

The information processing apparatus 110 includes a controller 111, a storage unit 112, and a communication unit 113. The controller 111 is, for example, a central processing unit (CPU). The controller 111 is operated by using a program stored in the storage unit 112 and executes processing for operations performed by the information processing apparatus 110. The storage unit 112 is, for example, a read only memory (ROM) or a hard disk, and stores a program executed by the controller 111 therein. The communication unit 113 is a network interface and sends and receives information via a network in response to an instruction from the controller 111.

The terminal 120 includes a controller 121, a storage unit 122, and a communication unit 123. The controller 121 is, for example, a CPU. The controller 121 is operated by using a program stored in the storage unit 122 and executes processing for operations performed by the terminal 120. The storage unit 122 is, for example, a ROM or a hard disk, and stores a program executed by the controller 121 therein. The communication unit 123 is a network interface and sends and receives information via a network in response to an instruction from the controller 121.

The programs processed by the controllers 111 and 121 may be provided through a computer readable information storage medium, such as an optical disc, a magnetic disk, magnetic tape, a magneto-optical disc, or a flash memory, or may be provided via a communication medium, such as the Internet.

Figure 2:
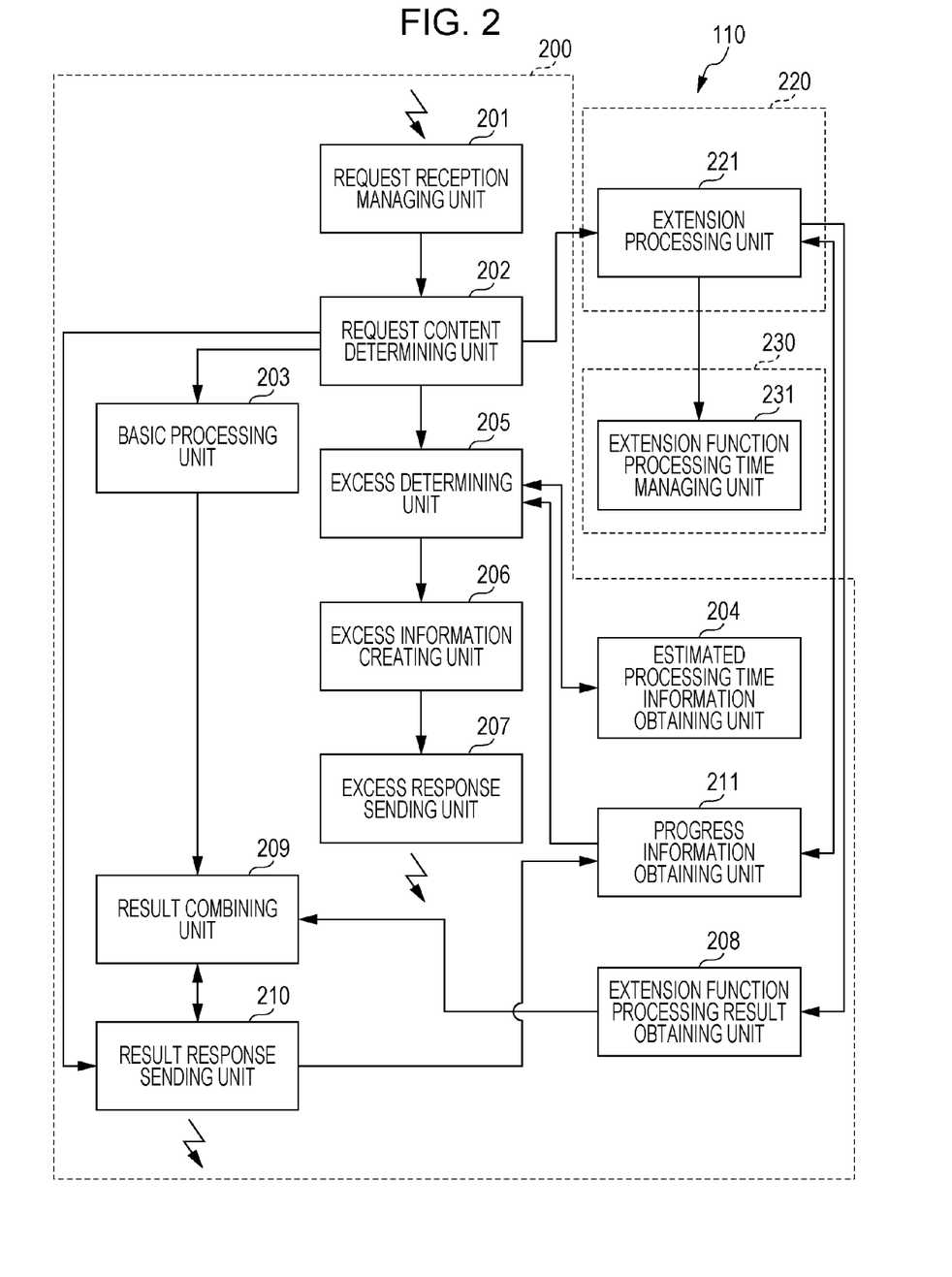
FIG. 2 illustrates examples of functions implemented by an information processing apparatus.

Examples of functions implemented by the information processing apparatus 110 will now be described below. FIG. 2 illustrates examples of functions implemented by the information processing apparatus 110. As shown in FIG. 2, the information processing apparatus 110 includes, as functions, a basic function unit 200, an extension function unit 220, and an extension function manager 230. The basic function unit 200 is specifically a Simple Object Access Protocol (SOAP) server that processes a received request in cooperation with another function unit by using SOAP, which is a protocol for specifying processing to be executed by another function unit and for managing processing results. The extension function unit 220 is specifically a function unit that executes a so-called plug-in, which is software for adding a function to an existing function of the basic function unit 200. The extension function unit 220 is, for example, Java virtual machine (JVM) (registered) for executing a plug-in written in Java (registered). The extension function unit 220 includes a function processor 221.

The extension function manager 230 manages the time which will be taken to execute processing by the extension function unit 220. The extension function manager 230 includes an extension function processing time managing unit 231.

The basic function unit 200 includes a request reception managing unit 201, a request content determining unit 202, a basic processing unit 203, an estimated processing time information obtaining unit 204, an excess determining unit 205, an excess information creating unit 206, an excess response sending unit 207, an extension function processing result obtaining unit 208, a result combining unit 209, a result response sending unit 210, and a progress information obtaining unit 211.

The request reception managing unit 201 manages the reception of requests addressed to the information processing apparatus 110 from the terminal 120. More specifically, the request reception managing unit 201 manages the reception of requests so that, before sending a response to a received request, another request will not be received. For example, upon receiving a request, the request reception managing unit 201 causes the information processing apparatus 100 to start a communication session for the received request and not to receive another request while the communication session is continuing. The communication session is a state in which hardware resources for performing communication concerning a received request are secured, and this state continues until a response to the received request is sent. Upon receiving a request, the request reception managing unit 201 creates request identification information for identifying the received request. The request reception managing unit 201 then associates the request identification information with the content of the received request and supplies the content of the received request to the request content determining unit 202.

The request content determining unit 202 obtains the content of the request received from the request reception managing unit 201, determines the content, and then supplies the content to a processor that is supposed to execute processing specified by the content of the request. More specifically, if the processing specified by the content of the request requires processing to be executed by the basic processing unit 203, the request content determining unit 202 supplies the content of the request to the basic processing unit 203. If the processing specified by the content of the request requires processing to be executed by the extension processing unit 221, the request content determining unit 202 supplies the content of the request to the extension processing unit 221. If the processing specified by the content of the request requires processing to be executed by the basic processing unit 203 and processing to be executed by the extension processing unit 221, the request content determining unit 202 supplies part of the content of the request corresponding to processing executed by the basic processing unit 203 to the basic processing unit 203 and part of the content of the request corresponding to processing executed by the extension processing unit 221 to the extension processing unit 221. If the content of the request indicates a request for a processing result, which will be discussed later, the request content determining unit 202 supplies the content of the request to the result response sending unit 210. If the request content determining unit 202 supplies the content of the request to the extension processing unit 221, it also supplies the content of the request to the excess determining unit 205 that makes a determination concerning an estimated processing time which will be taken to execute processing by the extension processing unit 221.

Figure 4:
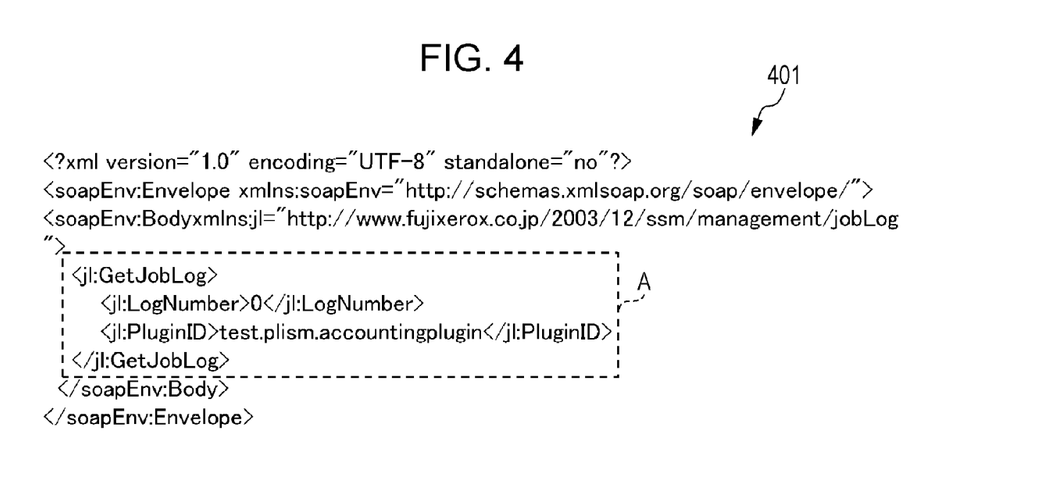
FIG. 4 illustrates an example of a request.

FIG. 4 illustrates an example of a request. A request 401 includes the content which specifies processing executed by the basic function unit 200 and processing executed by the extension function unit 220. The content of the request 401 is indicated by a rectangular portion A defined by the broken lines in FIG. 4. Processing for getting a log specified by log specifying information, which is part of the processing specified by the request 401 and indicated by the rectangular portion A, is processing to be executed by the basic function unit 200. Processing for an extension specified by a plug-in ID, which is part of the processing specified by the request 401 and indicated by the rectangular portion A, is processing to be executed by the extension function unit 220. A description will be given below, assuming that the request reception managing unit 201 receives the request 401. Upon receiving the request 401, the request reception managing unit 201 creates request identification information, and then associates the request identification information with the content of the request 401 and supplies the content of the request 401 to the request content determining unit 202. The request reception managing unit 201 also causes the information processing apparatus 100 to start a communication session for the request 401. The request content determining unit 202 determines the content of the request 401 obtained from the request reception managing unit 201, and then supplies part of the content of the request 401 which specifies processing for getting a log to the basic processing unit 203 and supplies part of the content of the request 401 which specifies processing for an extension to the extension processing unit 221 and the excess determining unit 205.

The basic processing unit 203 executes processing specified by the content of the request 401 received from the request content determining unit 202. The basic processing unit 203 then associates the request identification information with a processing result and supplies the processing result to the result combining unit 209.

The extension processing unit 221 executes processing specified by the content of the request 401 received from the request content determining unit 202. The extension processing unit 221 then associates the request identification information with a processing result and supplies the processing result to the extension function processing result obtaining unit 208. The extension processing unit 221 also supplies actual processing time information indicating the content of the executed processing and the time which has been taken to execute the processing to the extension function processing time managing unit 231.

Figure 5:
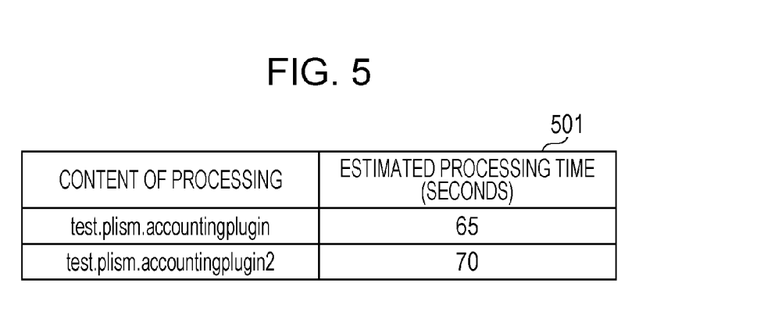
FIG. 5 illustrates an example of estimated processing time information.

The estimated processing time information obtaining unit 204 obtains estimated processing time information necessary for the excess determining unit 205 to make a determination. The estimated processing time information is information concerning an estimated processing time which will be taken to execute processing specified by a request according to the content of a request. FIG. 5 illustrates an example of the estimated processing time information. Estimated processing time information 501 is specifically a table in which the content of processing is associated with an estimated time which will be taken to execute processing by the extension processing unit 221. The estimated processing time information obtaining unit 204 supplies the obtained estimated processing time information 501 to the excess determining unit 205.

The excess determining unit 205 obtains the content of the request 401 from the request content determining unit 202 and the estimated processing time information from the estimated processing time information obtaining unit 204, and then determines, on the basis of the estimated processing time information, whether or not the estimated processing time for the received request exceeds a predetermined time. If it is determined that the estimated processing time exceeds a predetermined time, the excess determining unit 205 supplies the estimated processing time for the received request and the request identification information associated with the content of the request to the excess information creating unit 206. The predetermined time is a time determined on the basis of, for example, an expiring period of a communication session. In this exemplary embodiment, it is assumed that the predetermined time is, for example, 60 seconds. If the predetermined time is 60 seconds and if the content of the request 401 has been received, the excess determining unit 205 determines, on the basis of the estimated processing time information 501, that the estimated processing time exceeds the predetermined time, and supplies the estimated processing time and the request identification information concerning the request 401 to the excess information creating unit 206.

The excess information creating unit 206 creates excess information including information concerning the estimated processing time and the request identification information concerning the request 401 received from the excess determining unit 205. The excess information creating unit 206 then supplies the created excess information to the excess response sending unit 207.

Figure 6:
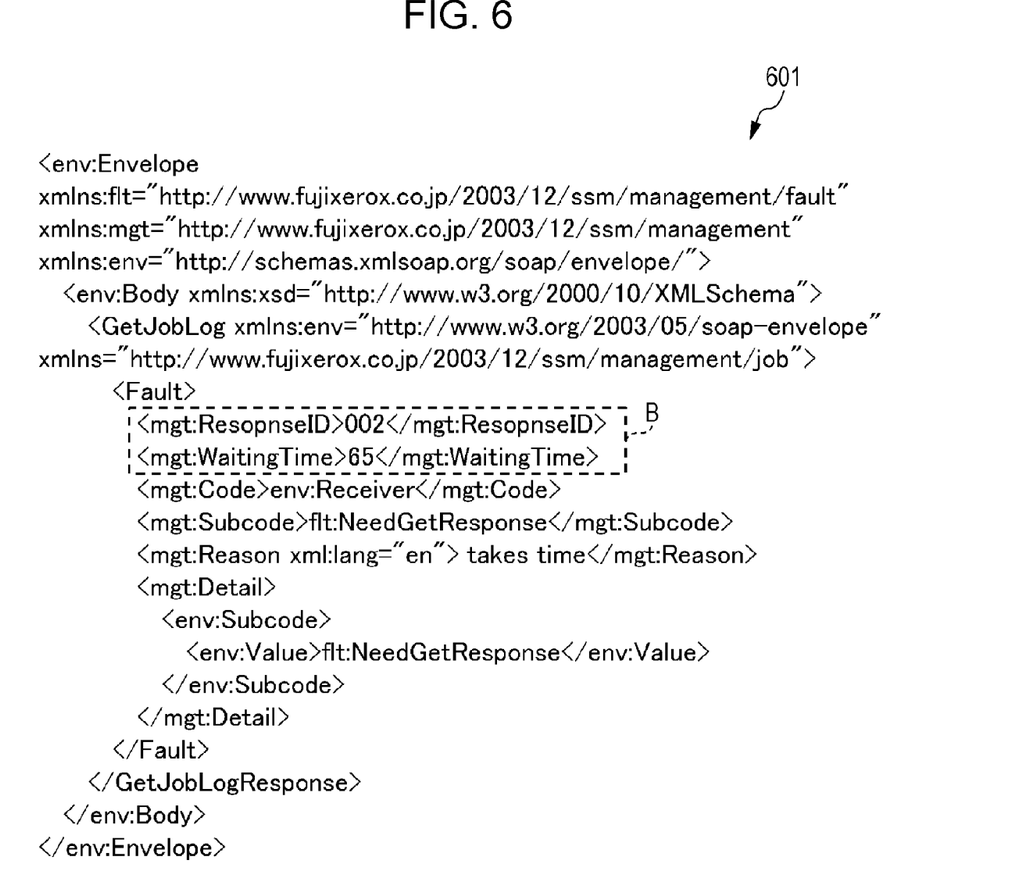
FIG. 6 illustrates an example of an excess response.

The excess response sending unit 207 sends an excess response, which is a response including the excess information obtained from the excess information creating unit 206, to the terminal 120. FIG. 6 illustrates an example of an excess response. An excess response 601 includes the request identification information concerning the request 401 and information concerning the estimated processing time, as indicated by a rectangular portion B defined by the broken lines in FIG. 6.

The extension function processing result obtaining unit 208 obtains a processing result generated in the extension processing unit 221 from the extension processing unit 221. The extension function processing result obtaining unit 208 supplies the obtained processing result generated in the extension processing unit 221 to the result combining unit 209.

The result combining unit 209 obtains the processing result generated in the basic processing unit 203 from the basic processing unit 203 and the processing result generated in the extension processing unit 221 from the extension function processing result obtaining unit 208, and combines the two processing results on the basis of the request identification information associated with each of the processing result. The result combining unit 209 supplies the combined processing result to the result response sending unit 210 in response to a request based on the request identification information from the result response sending unit 210.

Figure 7:
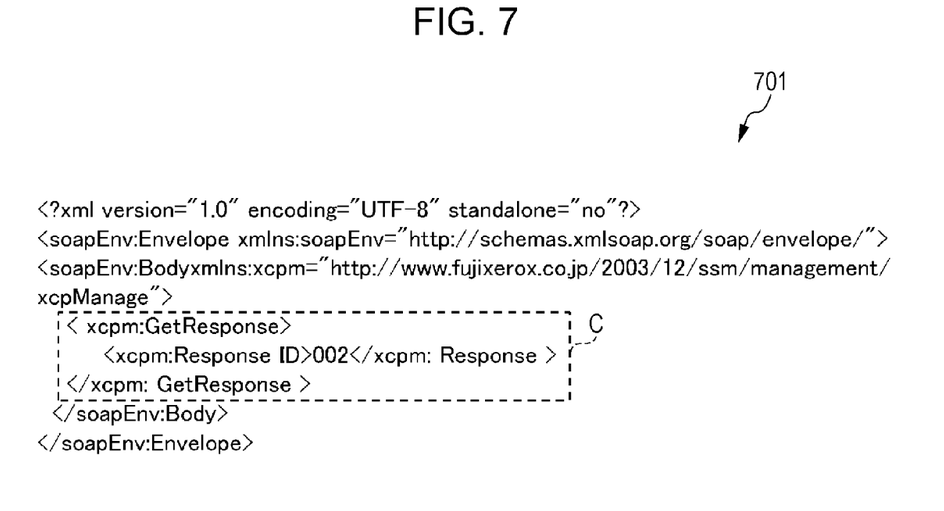
FIG. 7 illustrates an example of a request for a processing result.
Figure 8:
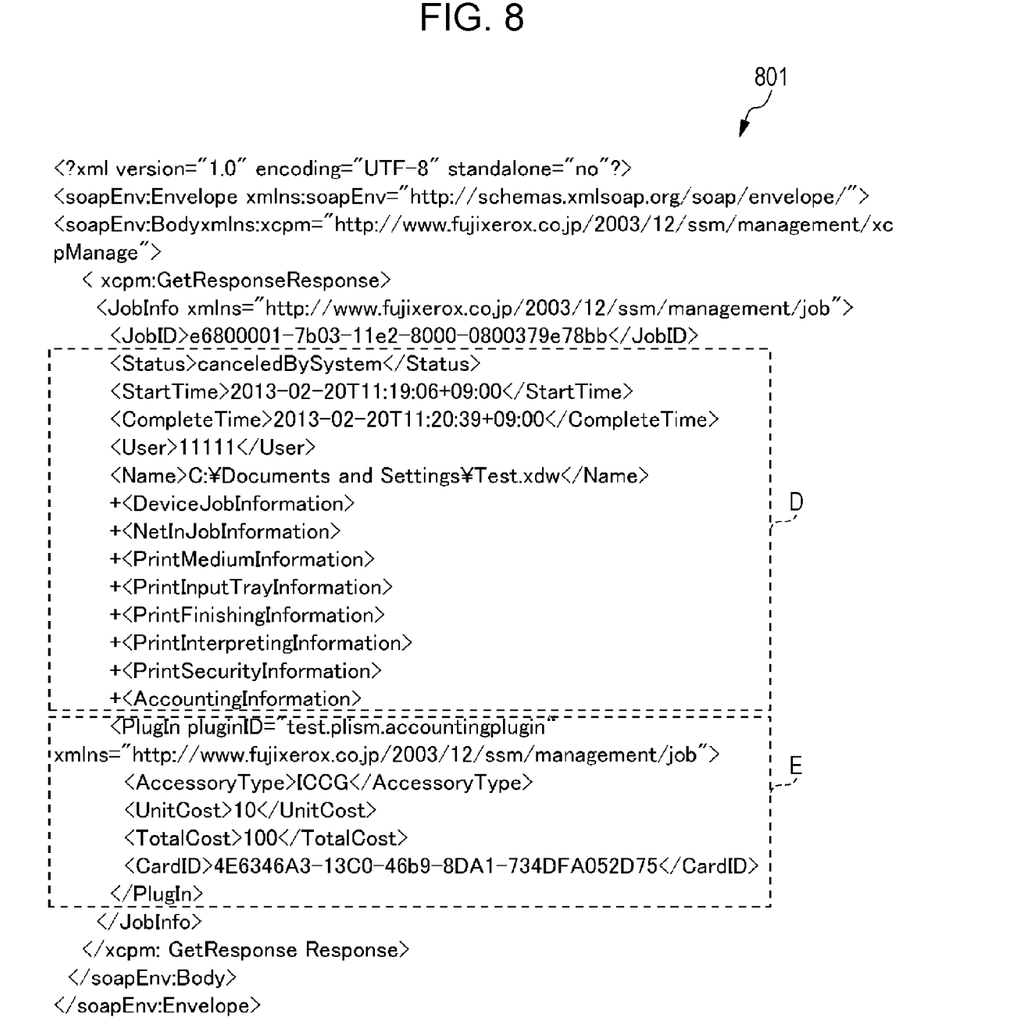
FIG. 8 illustrates an example of a result response.

Upon obtaining the content of a request for a processing result from the request content determining unit 202, the result response sending unit 210 obtains, from the result combining unit 209, a processing result corresponding to the request identification information included in the request for a processing result, and sends a result response, which is a response indicating the obtained processing result, to the terminal 120. FIG. 7 illustrates an example of a request for a processing result. A request 701 for a processing result includes request identification information for the request 401, as indicated by a rectangular portion C defined by the broken lines in FIG. 7. The result response sending unit 210 obtains the processing result of the request 401 from the result combining unit 209 on the basis of the request identification information concerning the request 401 included in the request 701. The result response sending unit 210 then adds the obtained processing result to a result response and then sends the result response to the terminal 120. FIG. 8 illustrates an example of a result response. A result response 801 includes a processing result generated in the basic processing unit 203 indicated by a rectangular portion D defined by the broken lines in FIG. 8 and a processing result generated in the extension processing unit 221 indicated by a rectangular portion E defined by the broken lines in FIG. 8. If the result response sending unit 210 has failed to obtain a processing result corresponding to the request identification information included in the request 701 for a processing result from the result combining unit 209, it supplies the request identification information included in the request 701 to the progress information obtaining unit 211.

The progress information obtaining unit 211 obtains, from the extension processing unit 221, progress information indicating the progress of processing of a request corresponding to the request identification information obtained from the result response sending unit 210. The progress information obtaining unit 211 then associates the request identification information with the obtained progress information, and supplies the progress information to the excess determining unit 205. Upon receiving the progress information, the excess determining unit 205 determines, on the basis of the progress information, whether or not the estimated processing time which will be taken to execute processing which is part of processing corresponding to the request for a processing result and which has not been completed exceeds a predetermined time.

Figure 3:
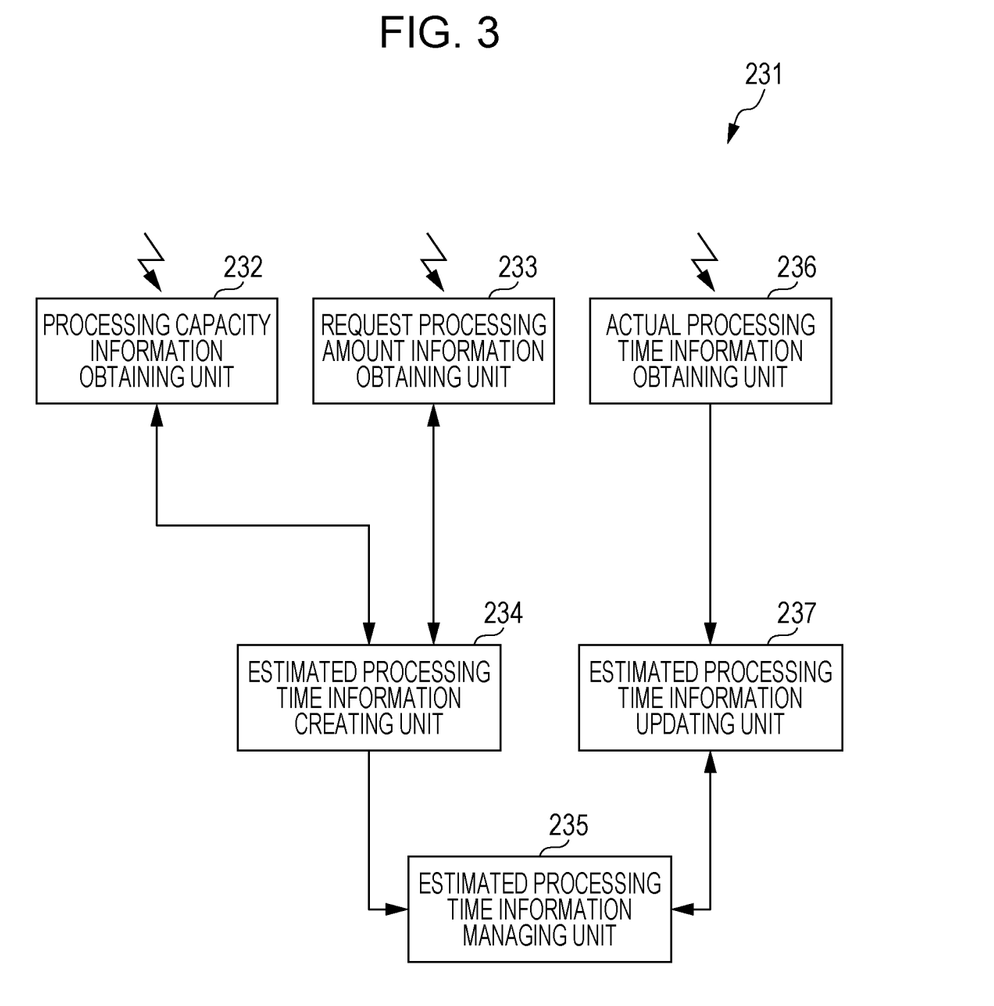
FIG. 3 illustrates examples of functions implemented by an extension function processing time managing unit.

The extension function processing time managing unit 231 creates and updates estimated processing time information. FIG. 3 illustrates functions implemented by the extension function processing time managing unit 231. As shown in FIG. 3, the extension function processing time managing unit 231 includes, as functions, a processing capacity information obtaining unit 232, a request processing amount information obtaining unit 233, an estimated processing time information creating unit 234, an estimated processing time information managing unit 235, an actual processing time information obtaining unit 236, and an estimated processing time information updating unit 237.

The processing capacity information obtaining unit 232 obtains processing capacity information indicating the processing capacity to execute processing specified by a request by the extension processing unit 221. The processing capacity information is, for example, information indicating the value of operation speed. The processing capacity information obtaining unit 232 supplies the obtained processing capacity information to the estimated processing time information creating unit 234.

The request processing amount information obtaining unit 233 obtains request processing amount information indicating a request processing amount, which is the amount of operation required for executing processing specified by a request, according to the content of a request. The request processing amount information is, for example, information which indicates the number of operations required for executing processing according to the content of a request. The request processing amount information obtaining unit 233 supplies the obtained request processing amount information to the estimated processing time information creating unit 234.

The estimated processing time information creating unit 234 creates estimated processing time information on the basis of the processing capacity information obtained from the processing capacity information obtaining unit 232 and the request processing amount information obtained from the request processing amount information obtaining unit 233. More specifically, the estimated processing time information creating unit 234 calculates the time which will be taken to execute the number of operations indicated by the request processing amount information on the basis of the value of the operation speed indicated by the processing capacity information. The estimated processing time information creating unit 234 supplies the created estimated processing time information to the estimated processing time information managing unit 235.

The estimated processing time information managing unit 235 manages the estimated processing time information obtained from the estimated processing time information creating unit 234. More specifically, the estimated processing time information managing unit 235 gives an instruction to store or call the estimated processing time information.

Figure 9:
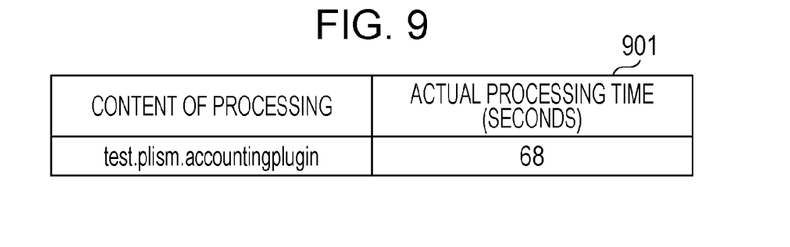
FIG. 9 illustrates an example of actual processing time information.

The actual processing time information obtaining unit 236 obtains actual processing time information from the extension processing unit 221. FIG. 9 illustrates an example of actual processing time information. Actual processing time information 901 indicates the content of processing executed by the extension processing unit 221 and the actual time which has been taken to execute processing. The actual processing time information obtaining unit 236 supplies the obtained actual processing time information to the estimated processing time information updating unit 237.

The estimated processing time information updating unit 237 obtains actual processing time information from the actual processing time information obtaining unit 236 and estimated processing time information from the estimated processing time information managing unit 235, and updates the estimated processing time information 501 on the basis of the actual processing time information. More specifically, the estimated processing time information updating unit 237 updates the estimated processing time in the estimated processing time information 501 corresponding to the content of processing indicated by the actual processing item information 901.

Figure 10:
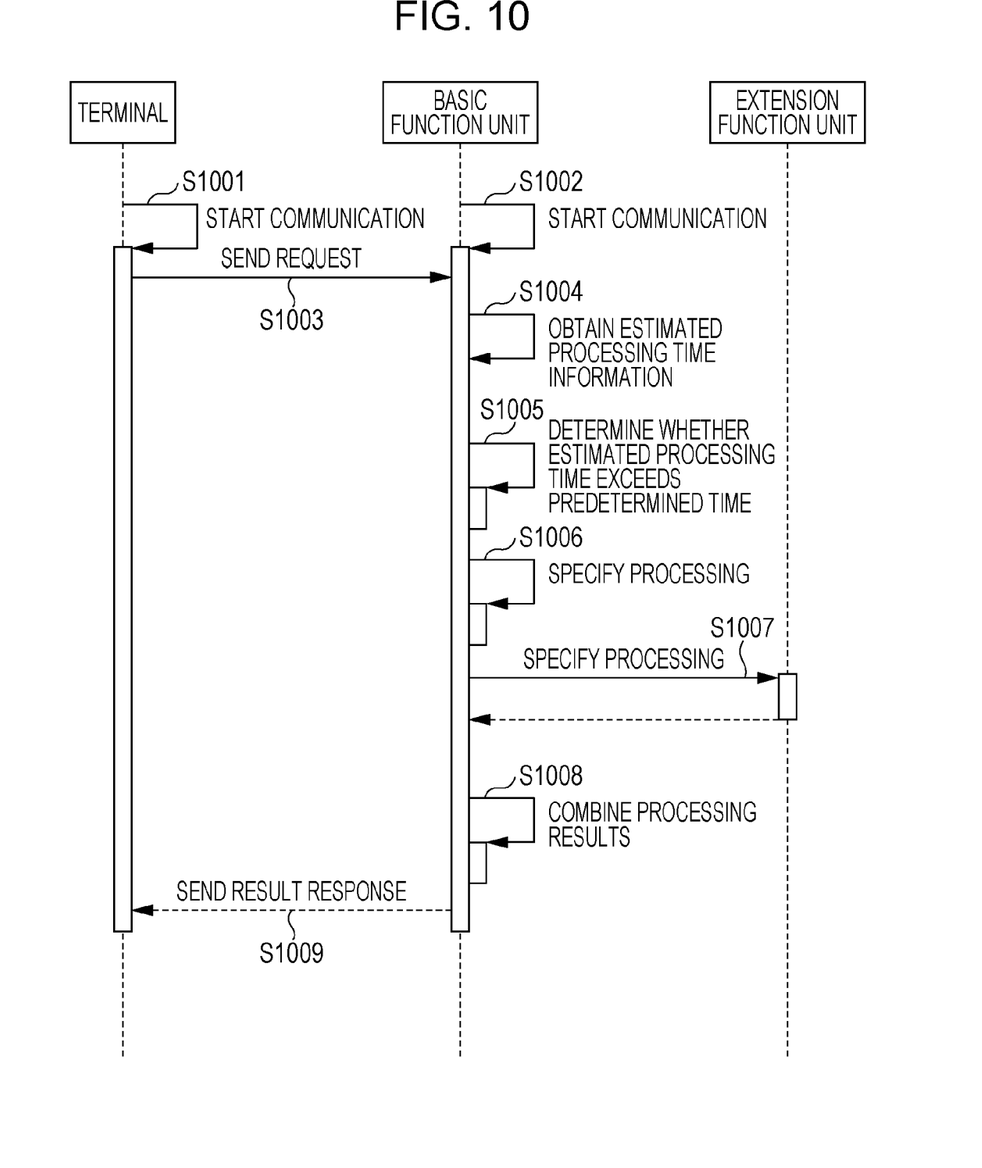
FIG. 10 illustrates an example of a sequence of processing executed in the information processing system.

A description will now be given of an overview of a flow of processing executed in the information processing system 100 in this exemplary embodiment. FIG. 10 illustrates an example of a sequence of processing executed in the information processing system 100. The sequence shown in FIG. 10 illustrates a case in which the estimated processing time which will be taken to execute processing specified by the content of the request 401 sent from the terminal 120 does not exceed a predetermined time.

In step S1001, the terminal 120 starts communication, and in step S1002, the information processing apparatus 110 starts communication. In step S1003, the terminal 120 sends a request 401. Then, if the basic function unit 200 determines that there is no request to which the basic function unit 200 has not responded, it receives the request 401 and associates request identification information for identifying the request 401 with the content of the request 401. Then, if the basic function unit 200 determines that processing in the extension function unit 220 is necessary to execute the content of the request 401, in step S1004, the basic function unit 200 obtains estimated processing time information 501 indicating the time taken to execute the processing by the extension function unit 220. Then, in step S1005, the basic function unit 200 determines whether or not the estimated processing time taken to execute the processing by the extension function unit 220 exceeds a predetermined time. In the example shown in FIG. 10, it is determined in step S1005 that the estimated processing time does not exceed a predetermined time. Then, in step S1006, the basic function unit 200 specifies processing to be executed in the basic function unit 200. In step S1007, the basic function unit 200 specifies processing to be executed in the extension function unit 220. Upon the completion of the processing in each of the basic function unit 200 and the extension function unit 220, in step S1008, the basic function unit 200 obtains a result of executing processing in the basic function unit 200 and a result of executing processing in the extension function unit 220, and combines the two results. Then, in step S1009, the basic function unit 200 sends a result response 801 including the combined processing result to the terminal 120. Then, the processing is terminated.

Figure 11:
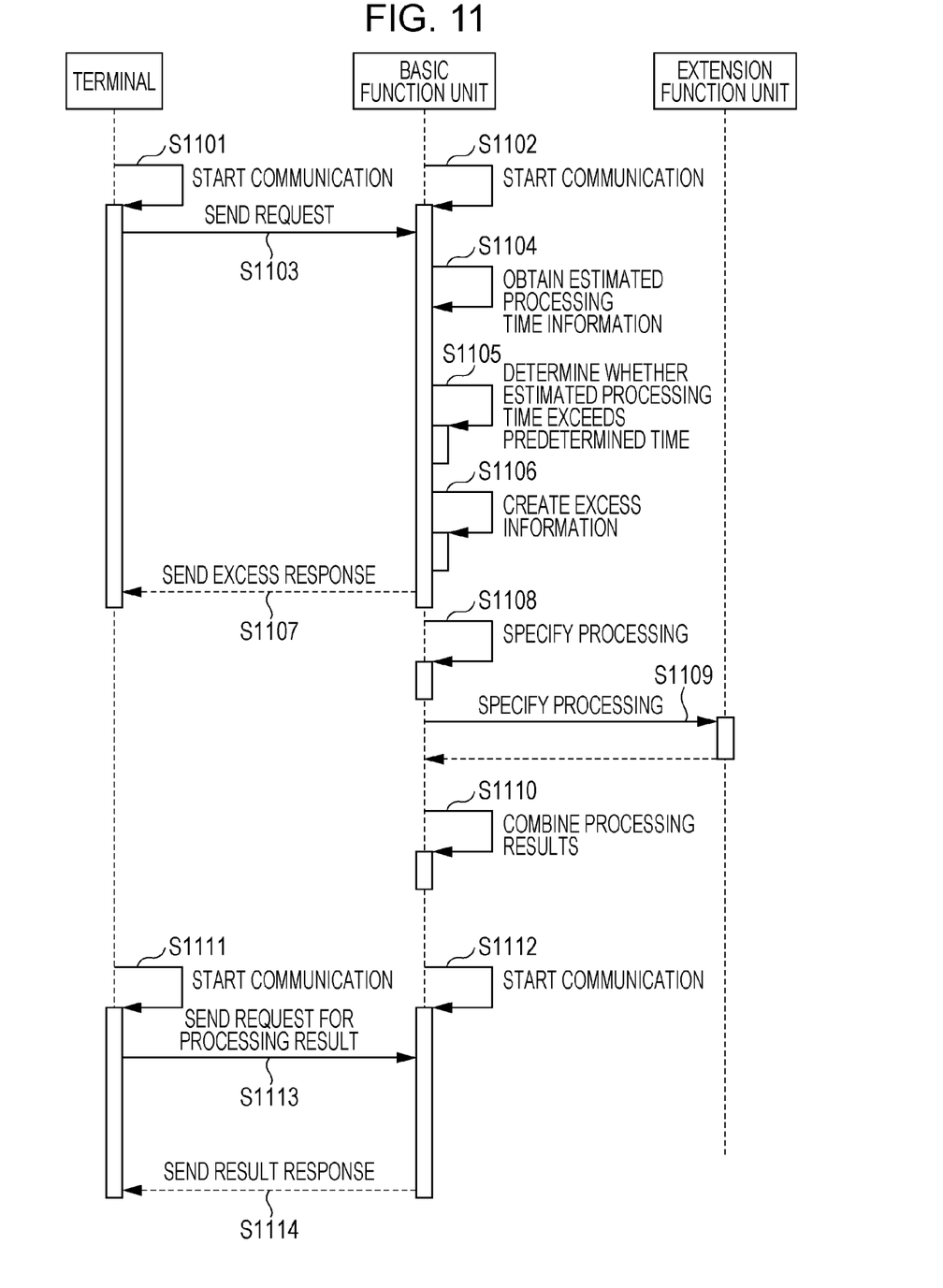
FIG. 11 illustrates an example of a sequence of processing executed in the information processing system.

A description will now be given of an overview of a flow of processing executed in the information processing system 100 in a case in which the estimated processing time which will be taken to execute processing specified by the content of the request 401 sent from the terminal 120 exceeds a predetermined time. FIG. 11 illustrates an example of a sequence of processing when the estimated processing time taken to execute processing indicated by the content of the request 401 sent from the terminal 120 exceeds a predetermined time. Steps S1101 through S1104 are the same as steps S1001 through S1004, respectively, of FIG. 10, and an explanation thereof will thus be omitted. In the example shown in FIG. 11, it is determined in step S1105 that the estimated processing time exceeds a predetermined time. Then, in step S1106, the basic function unit 200 creates excess information including request identification information concerning the request 401 and information concerning the estimated processing time. Then, in step S1107, the basic function unit 200 returns an excess response 601 including the excess information to the terminal 120. Then, in step S1108, the basic function unit 200 specifies processing to be executed in the basic function unit 200. In step S1109, the basic function unit 200 specifies processing to be executed in the extension function unit 220. Upon the completion of the processing in each of the basic function unit 200 and the extension function unit 220, in step S1110, the basic function unit 200 obtains a result of executing processing in the basic function unit 200 and a result of executing processing in the extension function unit 220, and combines the two results. When the excess response 601 is sent in step S1107, the communication session for the request 401 is disconnected and hardware resources secured for performing communication for the request 401 are released. Accordingly, after sending the excess response 601, the information processing apparatus 110 is able to receive a new request. After the lapse of the estimated processing time, in step S1111, the terminal 120 starts communication, and in step S1112, the information processing apparatus 110 starts communication. In step S1113, the terminal 120 sends a request 701 for a processing result. If the basic function unit 200 determines that there is no request to which the basic function unit 200 has not responded, it receives the request 701. Then, in step S1114, the basic function unit 200 obtains a processing result for the request 401 combined in step S1110, on the basis of the request identification information concerning the request 401 included in the request 701, and sends a result response 801 including the processing result for the request 401 to the terminal 120. Then, the processing is terminated.

Figure 12:
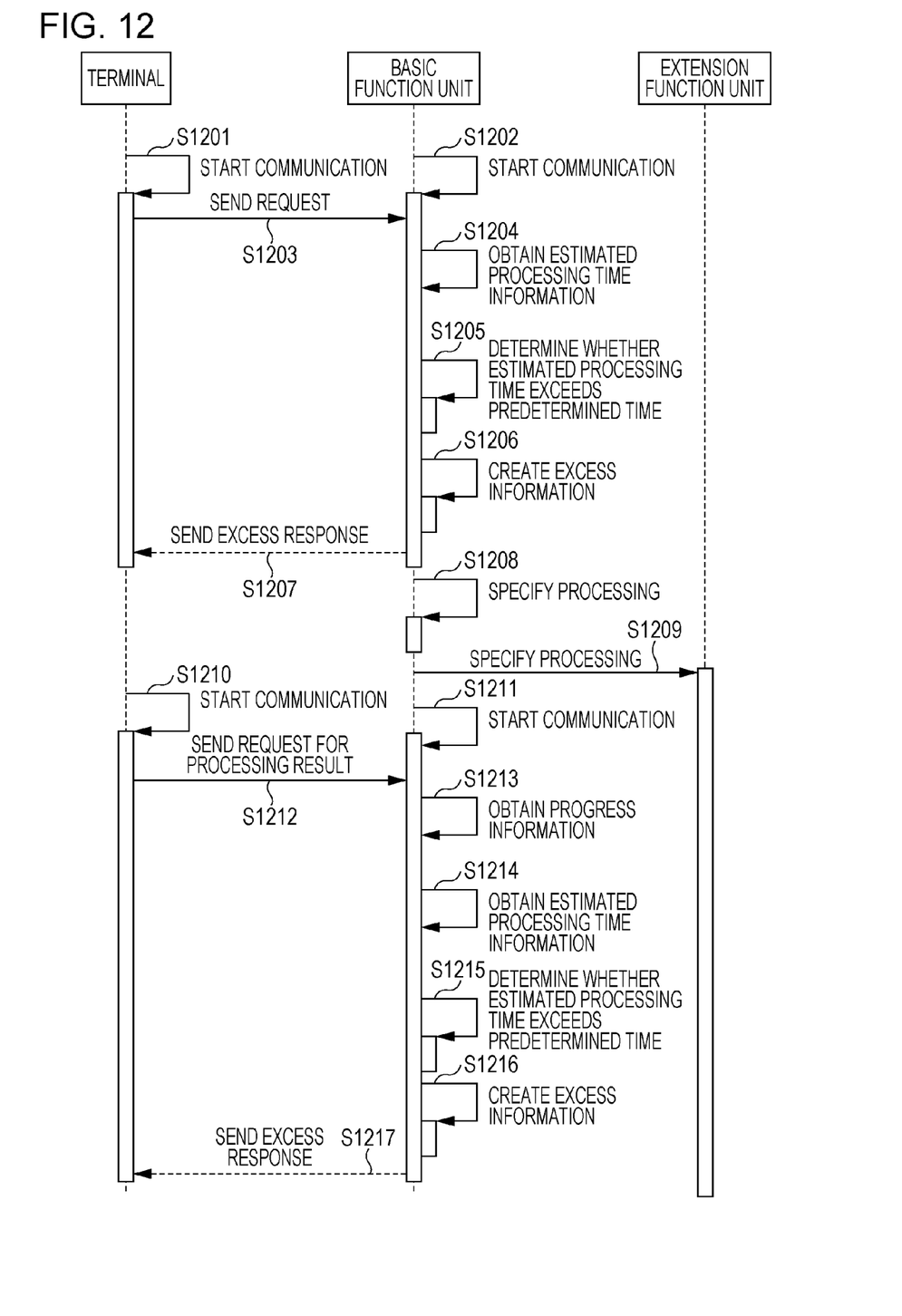
FIG. 12 illustrates an example of a sequence of processing executed in the information processing system.

A description will now be given of an overview of a flow of processing executed in the information processing system 100 in a case in which processing for the request 401 has not been completed when the request 701 for a processing result is received and in which the estimated processing time which will be taken to execute processing that has not yet been completed exceeds a predetermined time. FIG. 12 illustrates an example of a sequence of processing in a case in which the processing for the request 401 has not been completed when the request 701 for a processing result is received and in which the estimated processing time taken to execute the processing that has not yet been completed (unfinished portion of processing) exceeds a predetermined time. Steps S1201 through S1209 are the same as steps S1101 through S1109, respectively, of FIG. 11, and an explanation thereof will thus be omitted. In the example shown in FIG. 12, when the request 701 for a processing result is received, the processing specified in step S1209 has not yet been completed, as indicated by steps S1210 through S1212. In this case, in step S1213, the basic function unit 200 obtains progress information indicating the progress of processing for the request 401 from the extension function unit 220, on the basis of the request identification information concerning the request 401 included in the request 701, and associates the request identification information for the request 401 with the obtained progress information. Then, in step S1214, the basic function unit 200 obtains estimated processing time information 501. In step S1215, the basic function unit 200 determines, on the basis of the progress information and the estimated processing time information 501, whether or not the estimated processing time taken to execute processing that has not been completed exceeds a predetermined time. In the example shown in FIG. 12, it is determined in step S1215 that the estimated processing time exceeds a predetermined time. In this case, in step S1216, the basic function unit 200 creates excess information including information indicating the estimated processing time taken to execute processing that has not been completed and the request identification information. Then, in step S1217, the basic function unit 200 sends an excess response including the excess information to the terminal 120. An explanation of processing for the request 701 for a processing result after sending the excess response will be omitted.

Figure 13:
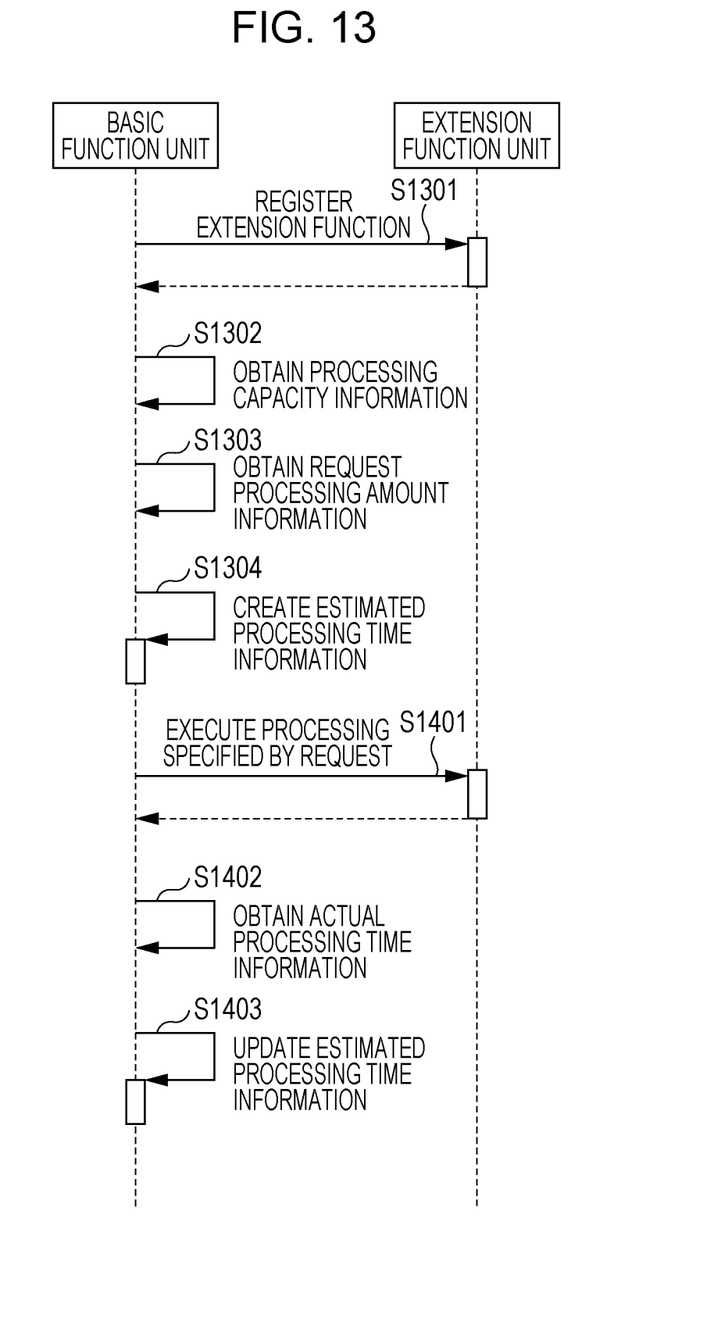
FIG. 13 illustrates an example of a sequence of processing executed in the information processing system.

A description will now be given of an overview of processing for creating and updating the estimated processing time information 501 by the information processing apparatus 110. FIG. 13 illustrates an example of a sequence of processing for creating and updating the estimated processing time information 501. Processing for creating the estimated processing time information 501 will first be discussed. In step S1301, an extension function is registered in the extension function unit 220. Then, in step S1302, the basic function unit 200 obtains processing capacity information, and in step S1303, the basic function unit 200 obtains request processing amount information. In step S1304, the basic function unit 200 creates the estimated processing time information 501 on the basis of the processing capacity information and the request processing amount information. Then, processing for updating the estimated processing time information 501 will be discussed. When processing specified by a request is executed in the extension function unit 220 in step S1401, the basic function unit 200 obtains actual processing time information in step S1402. In step S1403, the basic function unit 200 then updates the estimated processing time information 501 on the basis of the actual processing time information.

In the information processing apparatus 110 of this exemplary embodiment, if an estimated processing time taken to execute processing indicated by the content of the received request 401 exceeds a predetermined time, an excess response is returned. With this configuration, a communication session of Hyper Text Transfer Protocol (HTTP) is terminated, and thus, a response waiting state in communication between the information processing apparatus 110 and the terminal 120 is canceled. Accordingly, when a request is made for processing that will take time, a communication session does not have to be intentionally terminated in order to avoid an error, such as expiring of the communication session due to a long response waiting state. Additionally, the information processing apparatus 110 is able to receive another request since the response waiting state is canceled.

The present invention is not restricted to the above-described exemplary embodiment. For example, the functional configuration of the information processing apparatus 110 and the flow of the above-described processing are only examples.

For example, the extension function unit 220 may be included in a device different from the information processing apparatus 110, and the basic function unit 200 and the extension function unit 220 may be connected to each other via a network.

If the request 701 for a processing result of the processing specified by the request 401 is received and the processing has not been completed, the excess response sending unit 207 may return an excess response including an error message indicating that the information processing apparatus 110 has failed to obtain a processing result.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to execute:
an estimated processing time information obtaining unit configured to obtain estimated processing time information indicating an estimated processing time which will be taken to execute processing specified by a request received from a terminal;
an excess information creating unit configured to create excess information including information concerning the estimated processing time concerning the request in response to determining that the estimated processing time exceeds a predetermined time;
an excess response sending unit configured to send an excess response including the excess information;
a communication session canceling unit configured to cancel a communication session between the information processing apparatus and the terminal in response to the excess response sending unit sending the excess response;
a processing result obtaining unit configured to obtain a processing result of the processing specified by the request; and a result response sending unit configured to send a result response including the processing result in response to a request for the processing result.

2. The information processing apparatus according to claim 1, wherein the processor is further configured to execute:
a progress information obtaining unit configured to obtain progress information indicating progress of the processing specified by the request,
wherein, in response to the processing specified by the request having not been completed when the request for the processing result is received and an estimated processing time which will be taken to execute an unfinished portion of the processing exceeding the predetermined time, the excess information creating unit is further configured to create unfinished-portion excess information including information indicating the estimated processing time for the unfinished portion of the processing, and the excess response sending unit is further configured to send an excess response including the unfinished-portion excess information.

3. The information processing apparatus according to claim 1, wherein the processor is further configured to execute:
a processing capacity information obtaining unit configured to obtain processing capacity information indicating a capacity of a processor that executes processing specified by a request;
a request processing amount information obtaining unit configured to obtain request processing amount information indicating an amount of request processing required for executing processing specified by a request; and
an estimated processing time information creating unit configured to create the estimated processing time information on the basis of the processing capacity information and the request processing amount information.

4. The information processing apparatus according to claim 2, wherein the processor is further configured to execute:
a processing capacity information obtaining unit configured to obtain processing capacity information indicating a capacity of a processor that executes processing specified by a request;
a request processing amount information obtaining unit configured to obtain request processing amount information indicating an amount of request processing required for executing processing specified by a request; and
an estimated processing time information creating unit configured to create the estimated processing time information on the basis of the processing capacity information and the request processing amount information.

5. The information processing apparatus according to claim 1, wherein the processor is further configured to execute:
an actual processing time information obtaining unit configured to obtain, in a case in which the processing specified by the request is executed, actual processing time information indicating a time which has been taken to execute the processing specified by the request; and an estimated processing time information updating unit configured to update the estimated processing time information on the basis of the actual processing time information.

6. The information processing apparatus according to claim 2, wherein the processor is further configured to execute:
an actual processing time information obtaining unit configured to obtain, in a case in which the processing specified by the request is executed, actual processing time information indicating a time which has been taken to execute the processing specified by the request; and
an estimated processing time information updating unit configured to update the estimated processing time information on the basis of the actual processing time information.

7. The information processing apparatus according to claim 3, wherein the processor is further configured to execute:
an actual processing time information obtaining unit configured to obtain, in a case in which the processing specified by the request is executed, actual processing time information indicating a time which has been taken to execute the processing specified by the request; and
an estimated processing time information updating unit configured to update the estimated processing time information on the basis of the actual processing time information.

8. The information processing apparatus according to claim 4, wherein the processor is further configured to execute:
an actual processing time information obtaining unit configured to obtain, in a case in which the processing specified by the request is executed, actual processing time information indicating a time which has been taken to execute the processing specified by the request; and
an estimated processing time information updating unit configured to update the estimated processing time information on the basis of the actual processing time information.

9. A non-transitory computer readable medium storing a program causing a computer to execute a process, the process comprising:
obtaining estimated processing time information indicating an estimated processing time which will be taken to execute processing specified by a request received from a terminal;
creating excess information including information concerning the estimated processing time concerning the request in response to determining that the estimated processing time exceeds a predetermined time;
sending an excess response including the excess information;
canceling a communication session between the computer and the terminal in response to the sending the excess response including the excess information;
obtaining a processing result of the processing specified by the request; and
sending a result response including the processing result in response to a request for the processing result.

10. An information processing system comprising:
an information processing apparatus including a first processor configured to execute:

an estimated processing time information obtaining unit configured to obtain estimated processing time information indicating an estimated processing time which will be taken to execute processing specified by a request received from a terminal, an excess information creating unit configured to create excess information including information concerning the estimated processing time concerning the request in response to determining that the estimated processing time exceeds a predetermined time, an excess response sending unit configured to send an excess response including the excess information, a communication session canceling unit configured to cancel a communication session between the information processing apparatus and the terminal in response to the excess response sending unit sending the excess response;

a processing result obtaining unit configured to obtain a processing result of the processing specified by the request, and a result response sending unit that sends a result response including the processing result in response to a request for the processing result; and a terminal including a second processor configured to execute:

an excess information obtaining unit configured to obtain the excess information, and a result request sending unit configured to send a request for the processing result when the estimated processing time has elapsed.

11. The information processing apparatus according to claim 1, wherein the communication session canceling unit is further configured to terminate a wait cycle in the communication session between the information processing apparatus and the terminal in response to and based on the excess response.

12. The non-transitory computer readable medium according to claim 9, wherein the canceling the communication session comprises terminating a wait cycle in the communication session between the information processing apparatus and the terminal in response to and based on the excess response.

13. The information processing system according to claim 10, wherein the communication session canceling unit is further configured to terminate a wait cycle in the communication session between the information processing apparatus and the terminal in response to and based on the excess response.

* * * * *